(Model.)
J. W. FOARD.
FISH HOOK EXTRACTOR.
No. 253,363. Patented Feb. 7, 1882.
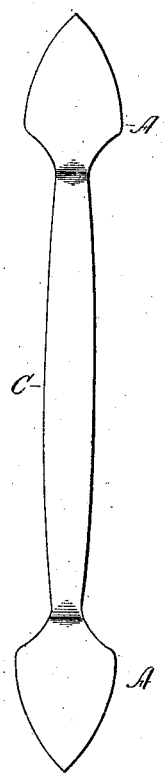
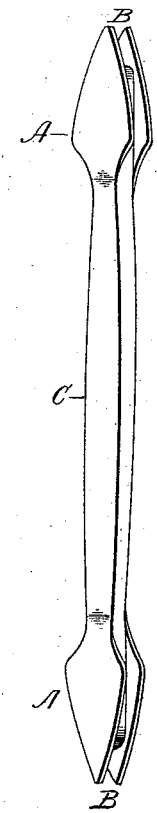
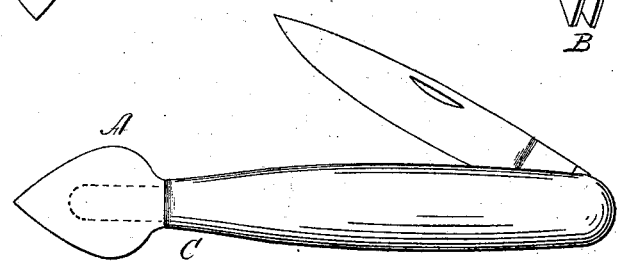
Witnesses
James H. Hough
Edward Everett
Inventor:
Jeremiah W. Foard

UNITED STATES PATENT OFFICE.

JEREMIAH W. FOARD, OF SAN FRANCISCO, CALIFORNIA.

FISH-HOOK EXTRACTOR.

SPECIFICATION forming part of Letters Patent No. 253,363, dated February 7, 1882.

Application filed October 1, 1881. (Model.)

*To all whom it may concern:*

Be it known that I, JEREMIAH W. FOARD, of the city of San Francisco, in the State of California, have invented a new and useful instrument wherewith to liberate a hook and draw it out of a fish's throat, of which the following is a specification.

The invention consists of a simple recess at the end of a shaft of any desired length, the recess being formed by overlapping flanges of such width as to cover the point of the hook and prevent its reinsertion into the flesh when being drawn out of the fish's throat.

Reference being had to the accompanying drawings, Figure 1 is a side view of the instrument complete, consisting of the shaft C, of any desired length, and the flanges A. Fig. 2 is an edge view in perspective, showing the recess B as formed by the flanges A upon either end of the shaft C. Fig. 3 shows the instrument in combination with an ordinary knife.

To extract a hook from a fish's throat the line is drawn moderately taut and the instrument inserted upon the shank of the hook, so as to embrace it within the recess B, then pushed down upon the inside of the bend of the hook till the barb is liberated. This done, the extractor is withdrawn bringing the hook with it.

I make the instrument of brass, soldering or riveting the flange-pieces to the shaft at either end to form the recess. I believe, however, that it may be made of malleable iron or of vulcanized india-rubber, in either case in one piece.

Having carefully set forth and described my invention, and shown how it is to be made and operated, I claim—

The fish-hook extractor herein described, consisting of the shaft C, having overlapping flanges A at the point and adjacent sides, forming recesses B, substantially as shown, and for the purposes specified.

JEREMIAH W. FOARD.

Witnesses:
OTIS V. SAWYER,
L. D. ALLEN.